United States Patent [19]

Sato et al.

[11] 4,197,492

[45] * Apr. 8, 1980

[54] CURRENT GENERATING SYSTEM WITH OUTPUT WINDING SWITCHING DEVICE

[75] Inventors: Suguru Sato, Oobu; Kazumasa Mori, Aichi, both of Japan

[73] Assignee: Nippondenso Co., Ltd., Kariya, Japan

[*] Notice: The portion of the term of this patent subsequent to May 17, 1994, has been disclaimed.

[21] Appl. No.: 838,967

[22] Filed: Oct. 3, 1977

[30] Foreign Application Priority Data

Oct. 19, 1976 [JP] Japan .................................. 51-125226

[51] Int. Cl.² ........................... H02J 7/16; H02P 9/30
[52] U.S. Cl. ......................................... 322/28; 322/29; 322/90; 320/64
[58] Field of Search ................ 322/28, 29, 90; 320/64, 320/68

[56] References Cited

U.S. PATENT DOCUMENTS

| | | | |
|---|---|---|---|
| 3,553,563 | 1/1971 | Kawashima | 322/28 X |
| 3,621,360 | 11/1971 | Wiley et al. | 320/64 X |
| 3,932,765 | 1/1976 | Townsend | 322/29 X |
| 4,024,456 | 5/1977 | Sato et al. | |
| 4,079,306 | 3/1978 | Mori et al. | 322/28 |

*Primary Examiner*—Robert J. Hickey
*Attorney, Agent, or Firm*—Cushman, Darby & Cushman

[57] ABSTRACT

A first and a second full-wave rectifying network are respectively connected with both ends of generating coils of a generator for respectively generating alternating current thereat. A switching device has normally closed contacts for making voltage differences among the input terminals of the second full-wave rectifying network zero, whereby the coils act as a star-connected current generating winding so long as the contacts are held closed. The switching device also has an energizing coil for actuating the normally-closed contacts to open when the rotational speed of the generator exceeds a predetermined value. When the normally-closed contacts are opened, the coils no longer act as the star-connected winding but an independently generating winding, to thereby increase the output current from the generator even when the generator operates at a relatively high rotational speed.

A terminal circuit having a resistor and diodes connected with input terminals of the first full-wave rectifying network supplies base current for a switching transistor of a voltage regulator so that the voltage regulator establishes a separate field excitation at an earlier stage of the rotational speed of the generator.

2 Claims, 3 Drawing Figures

CURRENT GENERATING SYSTEM WITH OUTPUT WINDING SWITCHING DEVICE

BACKGROUND OF THE INVENTION (1) Field of the Invention

The present invention relates to a current generating system, and more particularly to the system having a self-excitation alternating current generator used in a motor vehicle for supplying electric power to a battery, electric loads such as lamps and so on.

(2) Description of Prior Art

It is recently required for a generating system used in a motor vehicle to produce sufficient electric energy during whole operating conditions of the engine mounted in the vehicle, namely at a low speed operation as well as a high speed operation of the engine.

In this respect, it is known that electrical connections of poly-phase current generating windings of the generator are changed in response to the operating conditions thereof to obtain higher electric energy. For example, in a separate excitation generator of three-phase current generating type, the windings are arranged as three-phase Y-connected windings at the low speed operation while the windings are changed to operate as respective independent generating windings at the high speed operation, as it is disclosed in a U.S. Pat. No. 4,024,456 granted to the present inventors.

On the other hand, it is a problem of a current generating system having a self-excitation generator that a rotational speed of the generator, where it begins to generate an output of alternating current, is higher than that of the separate excitation generator. In a conventional self-excitation generator, a rotor of the generator, especially pole cores thereof are made of a material such as having a high residual magnetism, or number of winding turns of an armature is increased, in order to decrease the rotational speed of the generator where it begins to generate the output.

However, even though the material having the high residual magnetism is used for the pole cores, or special treatments are employed for the pole cores to increase the residual magnetism thereof, there exists a limit of the rotational speed decrease. Accordingly, the rotational speed of the self-excitation generator where the generator begins to generate the output is still higher than that of the separate excitation generator.

In addition when the number of winding turns is increased to increase the output energy at the low-speed operation of the generator, the output energy thereof is contrariwise decreased during the high-speed operation, with a result that the effective charging for a battery can not be obtained during the high-speed operation.

SUMMARY OF THE INVENTION

It is, therefore, an object of the present invention to provide an improved generating system to overcome the above drawbacks.

It is another object of the present invention to provide an improved generating system of the type in which the electrical connections of the generating windings are changed in response to the operating conditions to obtain the sufficient output energy at low speed operation as well as high-speed operation.

It is a further object of the present invention to provide a generating system having a self-excitation generator which enables to decrease the number of rotational speed of the generator where it begins to generate the output, and thereby establishes a separate field excitation at an earlier stage of the rotational speed of the generator.

It is a still further object of the present invention to provide an improved generating system which is low in cost, simple in construction, reliable in use and so on.

These and other objects of the present invention will be seen by reference to the drawings, taken in connection with the accompanying drawings.

DETAILED DESCRIPTION OF THE PREFERRED EMBODIMENT

Figure 1:
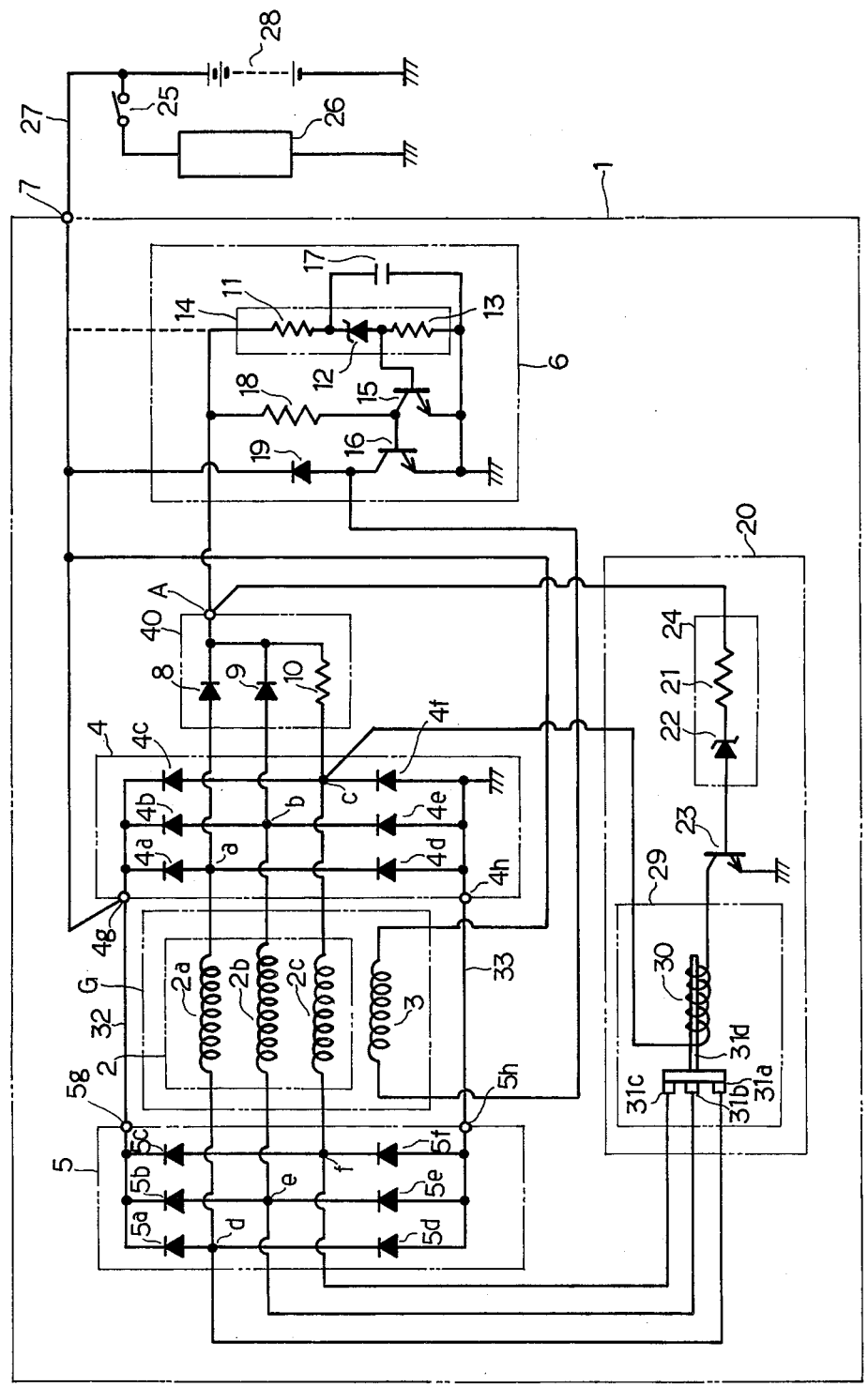
FIG. 1 is an electric wiring diagram showing a generating system according to the present invention.

Referring now to FIG. 1, a three-phase alternating current generator G, which is driven by an engine (not shown), includes a three phase generating winding 2 having three generating coils 2a, 2b, and 2c and a field winding 3. A first full-wave rectifying network 4 includes three positive diodes 4a, 4b and 4c, three negative diodes 4d, 4e and 4f, a first positive direct current output terminal 4g connected with respective cathodes of the positive diodes, and a first negative direct current output terminal 4h connected with the respective anodes of the negative diodes, which is grounded.

Each one end of the three generating coils 2a, 2b and 2c is respectively connected with AC input terminals of the respective pairs of the positive diodes 4a, 4b and 4c and the negative diodes 4d, 4e and 4f, designated at a, b and c.

A second full-wave rectifying network 5 likewise includes three positive diodes 5a, 5b and 5c, three negative diodes 5d, 5e and 5f, a second positive direct current output terminal 5g connected with the respective cathodes of the positive diodes, and a second negative direct current output terminal 5h connected with the respective anodes of the negative diodes. Each other end of the three generating coils 2a, 2b and 2c is likewise respectively connected with AC input terminals of the respective pairs of the positive diodes 5a, 5b and 5c and the negative diodes 5d, 5e and 5f designated at d, e and f.

The first and second positive direct current output terminals 4g and 5g are connected with each other through a conductor 32 and so are the first and second negative direct current output terminals 4h and 5h through a conductor 33.

A terminal circuit 40 having diodes 8 and 9 and a resistor 10 forms a third positive direct current output terminal A, where a direct current is appeared when the generates G begins to generate the output. Each one end of the diodes 8 and 9 and the resistor 10 is connected with the AC input terminals a, b and c of the first full wave rectifying network 4, while the other ends are connected to the terminal A.

A voltage regulator 6 includes a voltage responsive circuit 14 connected to the third positive terminal A for responding the output voltage of the generator G. The circuit 14 comprises voltage dividing resistors 11 and 13 and a zener diode 12. The regulator 6 also includes a capacitor 17 connected across the zener diode 12 and the resistor 13 for smoothing the output voltage from the terminal A. The voltage responsive circuit 14 need not be always connected to the terminal A, but may be, of course, connected to the first positive terminal 4g of the first rectifying network 4 as indicated by a dotted line in the drawings.

The regulator 6 also includes a first transistor 15, a second transistor 16, a resistor 18 and a flywheel diode 19 to proceed a switching operation for the field winding 3 in accordance with a potential applied to the circuit 14. The base of the first transistor 15 is connected with the voltage responsive circuit 14 so that the conduction and non-conduction of the first transistor 15 is controlled by the voltage drop developed across the resistor 13 which responds to output voltage at the terminal A. The collector-emitter path of the first transistor 15 is connected across the terminal A and the ground through the resistor 18, and the collector thereof is also connected to the base of the second transistor 16 so that the terminal A supplies the base current for the second transistor and the conduction or non-conduction of the second transistor 16 is controlled by the first transistor 15. The collector-emitter path of the second transistor 16 is connected in series with the field winding 3 of the generator G to form a field excitation circuit, one of which is connected to the output terminal of the generator G or another power supply source such as a battery 28, wherein the flywheel diode 19 is connected across the field winding 3.

A switching device 29 of a control circuit 20 comprises an energizing coil 30 and normally closed contacts 31a, 31b, 31c and 31d, wherein fixed contacts 31a, 31b and 31c are respectively connected to the AC input terminals d, c and f of the second rectifying network 5 while the movable contact 31d normally closes the contacts 31a to 31c with each other and is energized by the energizing coil 30 to open the contacts 31a to 31d when the coil 30 is energized.

When the contacts 31a to 31d are closed, voltage differences among the input terminals d, e and f of the second rectifying network 5 are made zero, whereby the generating coils 2a to 2c act as a Y-connected winding. On the other hand, when the contacts 31a to 31d are opened, voltage differences are appeared among the input terminals d, e and f and those voltage differences are derived from the second full-wave rectifying network 5 as direct current. Accordingly, the generating coils 2a to 2c act as independent alternating generating windings when the contacts 31a to 31d are opened.

The control circuit 20 for controlling the energization of the coil 30 comprises a voltage detecting means 24 having a resistor 21 and a zener diode 22 connected to the terminal A for detecting the output voltage at the terminal A. The control circuit 20 also comprises a transistor 23 having a base connected to the voltage detecting means 24 and a collector-emitter path connected to a source of current through the energizing coil 30 of the switching device 29, so that when the output voltage at the terminal A exceeds a zener voltage of the zener diode 22 the transistor 23 is made conductive and thereby the coil 30 is energized to open the contacts 31a, 31b and 31c. The source of current for the coil 30 is the terminal c in the present embodiment, however it may be, of course, the battery 28, the output terminal 4g of the generator G or the like. The voltage detecting means 24 is connected to the terminal A in the above embodiment for detecting the output voltage of the generator G, however, it may be also connected to the terminal 4g or the battery 28.

The generator G, the first and second rectifying networks 4 and 5, the voltage regulator 6, the control circuit 20, the switching device 29 and the terminal circuit 40, which are already described above, are all embedded in a generator housing designated by numeral 1, so that one terminal 7 is derived from the generator housing 1 and is connected to the battery 28 through a conductor 27.

Numeral 25 designates an ignition key switch and numeral 26 designates an electrical load connected to the battery 28 through the key switch 25.

An operation of the current generating system of the embodiment just described will be explained below. Since the switching device 29 normally closes the contacts 31a to 31d, the three generating coils 2a to 2c form a star-connected (three-phase Y-connected) output winding at the beginning of generating the output. When the generator G starts to rotate by the engine (not shown), the generator G, more particularly the star-connected generating coils 2a to 2c begin to generate the output of the alternating current by the residual magnetism of the generator G. The alternating current is rectified by means of the diodes 8 and 9 and the resistor 10 of the terminal circuit 40 as well as the negative diodes 4d to 4f of the first rectifying network 4, so that the alternating current is converted into direct current to produce a voltage potential at the terminal A. Here it should be noted that since the terminal circuit 40 includes two diodes 8 and 9 and the resistor 10, the voltage potential is produced at the terminal A earlier than that produced in a case where the terminal circuit 40 consists of three diodes in place of the diodes 8 and 9 and the resistor 10. As above, the small voltage potential is produced at the terminal A by the residual magnetism and it is then applied to the base of the transistor 16 of the voltage regulator through the resistor 18. The resistance value of the resistor 18 is so determined that the second transistor 16 is driven into conduction (an active state) by the base current from the terminal A when the running speed of the engine reaches an idling speed thereof. When the transistor 16 becomes active an initial field excitation for the generator G is established from the battery 28 through a field energizing circuit comprising the conductor 27, the field winding 3 and the active collector-emitter path of the transistor 16. This initial field excitation is not maximum for the field excitation since the second transistor 16 is not saturated because of the small base current. With the initial field excitation, however, the generator G increases the output energy with the increase of the voltage potential at the terminal A of the circuit 40, whereby the active state of the transistor 16 is enhanced to its saturated (conductive) state. With the saturation of the transistor 16, a full field excitation for the generator G is established from the battery 28 through the field energizing circuit, and then the generator G operates in a normal condition, that is, the generator G increases the output energy as the engine speed increases as shown in FIG. 3.

Figure 3:
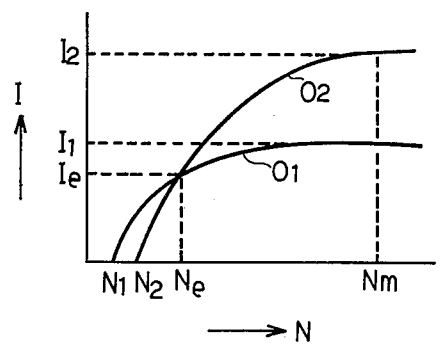
FIG. 3 is a diagram showing characteristic curves of the output according to the present generating system.

A curve $O_1$ in FIG. 3 shows a characteristic curve of the output current from the generator G in the above condition where the generating winding 2 act as the three-phase Y-connected output winding. The axis of abscissa in FIG. 3 represents a rotational speed N of the generator G (or the engine) while the longitudinal axis representing the output current from the generator G.

As seen from FIG. 3, the output current according to the curve $O_1$ sharply rises to become sufficient to charge the battery and the electrical loads at a relatively low speed operation (the rotational speed of $N_1$), however the rising rate of the output current becomes smaller as the rotational speed of the generator increases. Namely, the output current produced from the generator with the star-connected winding is sufficient to charge the battery at the relatively low speed operation but insufficient at the relatively high speed operation.

When the output voltage at the terminal A exceeds a predetermined value, the zener diode 22 is made conductive to drive the transistor 23 into conduction. With the conduction of the transistor 23, electric current flows through the energizing coil 30 from the terminal c of the first network 4 to open the switch 29 with a result that the contacts 31a to 31c are separated from each other.

When the switch 29 is opened the generating coils 2a, 2b and 2c operate as independent generating coils, so that the alternating output current produced at the respective coils 2a to 2c is subjected to the full-wave rectifying operation at the first and second full-wave rectifying networks 4 and 5. For example, when the voltage appears at the generating coil 2a being positive at one end a and negative at the other end d, current flows through the diode 4a, the positive direct current terminal 4g, the conductor 27, the battery 28 the negative direct current terminal 4h, the conductor 33 and the diode 5d. When the voltage polarity is reversed at the generating coil 2a, current flows through the diode 5a, the positive direct current terminal 5g, the conductor 32, the positive direct current terminal 4g, the conductor 27, the battery 28 and the diode 4d. Thus, the alternating current produced at the generating coil 2a is subjected to the full-wave rectifying operation carried by the diodes 4a and 4d of the first rectifying network 4 and the diodes 5a and 5d of the second rectifying network 5, and the alternating current produced at the other two phase coils 2b and 2c is likewise subjected to the full-wave rectifying operation respectively carried by the diodes 4b, 4e, 5b and 5e and the diodes 4c, 4f, 5c and 5f, to thereby charge the battery 28 and supply the electrical load 26 with the output direct current.

As in the above operation, the output current characteristics obtained in the full-wave independently rectifying operation becomes similar to that obtained from the delta-connected generating winding, which is indicated by a curve $O_2$ in FIG. 3.

According to the curve $O_2$, the output current from the generator G rises at the rotational speed of $N_2$ higher than $N_1$, becomes equal to the output current $I_e$ of the curve $O_1$ at the rotational speed of $N_e$ and becomes higher than that of the curve $O_1$ above the rotational speed of $N_e$ as seen in FIG. 3. The maximum output current $I_2$ of the curve $O_2$ is almost 1.7 times as high as that $I_1$ of the curve $O_1$.

According to the present embodiment, the normally closed contacts 31a to 31d of the switch 29 is so arranged as to open its contacts when the output at the terminal A exceeds the predetermined value that is, when the rotational speed of the generator exceeds the predetermined value of $N_e$, whereby the generating coils 2a, 2b and 2c act as three-phase Y-connected generating winding during the rotational speed of the generator G being below the speed $N_e$ and they act as three-phase independent generating winding during the rotational speed being above the speed $N_e$, thus to obtain the sufficient output energy during the whole operational conditions of the generator.

During the above operation, the voltage regulator 6 operates as follows irrespective of the opened or closed condition of the switch 29. The voltage responsive circuit 14 responds the output voltage of the generator, more particularly the voltage appeared at the terminal A in the embodiment, so that when the voltage across the resistor 13 exceeds a desired level the first transistor 15 is made conductive causing the second transistor 16 in a non-conductive state by removing the base current therefor. Accordingly, the field excitation is stopped to decrease the output energy of the generator G. Then, the voltage developed across the resistor 13 becomes lower than the desired level to drive again the first transistor 15 into non-conduction, and thereby the second transistor 16 is made conductive due to the base current from the terminal A through the resistor 18 to establish the field excitation again. Repeating the above conduction and non-conduction of the second transistor 16 makes it possible to regulate the output voltage of the generator G at a desired constant value.

Figure 2:
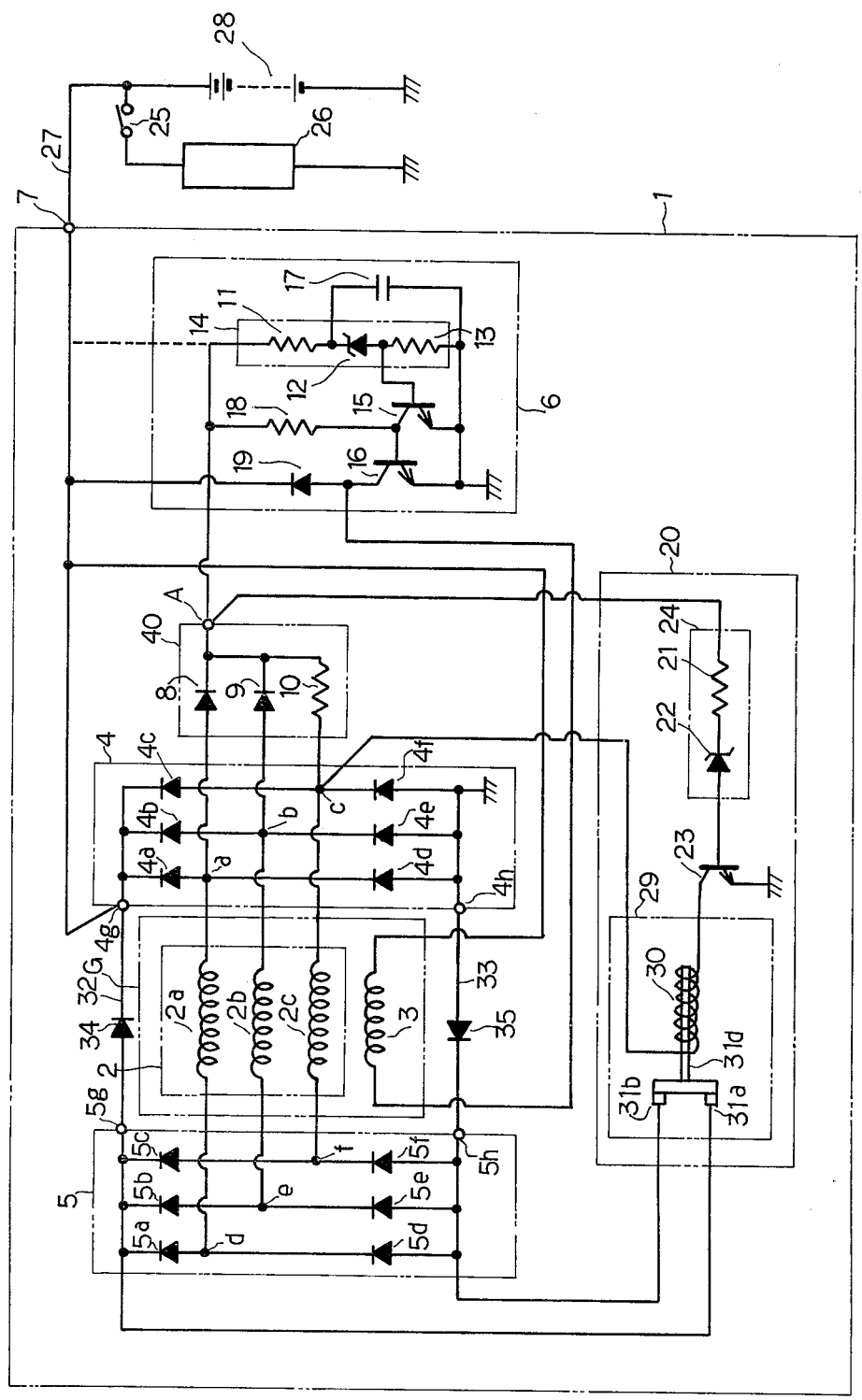
FIG. 2 is an electric wiring diagram showing another embodiment of the current generating system of the present invention.

Referring next to FIG. 2 showing another embodiment of the present invention, wherein the same reference numerals are used to designate the same or equivalent parts as that of FIG. 1, different construction and operation of the embodiment are principally explained hereinafter.

Additional diodes 34 and 35 are respectively connected between the first and second full-wave rectifying networks 4 and 5, in such a manner that the cathode of the diode 34 is connected with the first positive terminal 4g, the anode thereof with the second positive terminal 5g, the anode of the diode with the first negative terminal 4h and the cathode thereof with the second negative terminal 5h.

The switch 29 comprises one movable contact 31d and two normally-closed fixed contacts 31a and 31b. The contact 31a is connected to the cathode sides of the diodes 5a to 5c of the second network 5, while the contact 31b is connected to the anode sides of the diodes 5d to 5f, so that when the contacts 31a and 31b are closed with each other through the movable contact 31d the generating coils 2a to 2c act as three-phase Y-connected winding. On the other hand, when the contacts 31a and 31b are separated from each other the generating coils 2a to 2c act as three independent generating windings. The other construction and operation of the embodiment shown in FIG. 2 is almost the same as that of FIG. 1.

In the above embodiments, other poly-phase alternating current generator can be also employed in place of the three-phase alternating current generator.

What is claimed is:

1. A current generating system for a motor vehicle comprising;
   a three-phase alternating current generator having a field winding and three generating coils;
   a first full-wave rectifying network having a first positive direct current terminal, a first negative direct current terminal and three input terminals respectively connected with each one end of said three generating coils;
   a second full-wave rectifying network having a second positive direct current terminal, a second negative direct current terminal and three input terminals respectively connected with each of the other ends of said three generating coils;

a battery connected across said first positive and negative direct current terminals of said first full-wave rectifying network;

a first diode connected at its cathode with said first positive direct current terminal and at its anode with said second positive direct current terminal;

a second diode connected at its anode with said first negative direct current terminal and at its cathode with said second negative direct current terminal;

a terminal circuit including a resistor and two diodes, one end of said resistor and anodes of said diodes being respectively connected to said input terminals of said first full-wave rectifying network, and the other end of said resistor and cathodes of said diodes being connected together with each other for forming a third positive terminal;

a switching device having normally-closed contacts connected between said second positive and negative direct current terminals and an energizing coil for opening said contacts when electrically energized;

a voltage detection circuit for detecting the output of said generator and electrically energizing said energizing coil of said switching device when the output of said generator exceeds a predetermined value; and a voltage regulator including a voltage sensing circuit for responding the output voltage of said generator and a switching transistor having a collector-emitter path connected in series with said field winding, said third positive terminal of said terminal circuit being connected with the base of said switching transistor for supplying base current therefor, said voltage regulator also including a control transistor having a collector-emitter path connected across the base-emitter path of said switching transistor and a base connected to said voltage sensing circuit so that said control transistor removes the base current for the switching transistor when the output voltage of said generator exceeds a desired level.

2. A current generating system for a motor vehicle comprising;

a three-pahse alternating current generator having a field winding and three generating coils;

a first full-wave rectifying network having a first positive direct current terminal, a first negative direct current terminal and three input terminals respectively connected with each one end of said three generating coils;

a second full-wave rectifying network having a second positive direct current terminal, a second negative direct current terminal and three input terminals respectively connected with each of the other ends of said three generating coils;

a battery connected across said first full-wave rectifying network;

a first diode connected at its cathode with said first positive direct current terminal and at its anode with said second positive direct current terminal;

a second diode connected at its anode with said first negative direct current terminal and at its cathode with said second negative direct current terminal;

switching means normally connecting said second positive direct current terminal with said second negative direct current terminal;

control means for detecting the rotational speed of said generator and for actuating said switching means to break the electrical connection between said second positive and negative direct current terminal when the rotational speed of said generator exceeds a predetermined value; and a terminal circuit including a resistor and two diodes, one end of said resistor and anodes of said diodes being respectively connected to said input terminals of said first full-wave rectifying network, and the other end of said resistor and cathodes of said diodes being connected together with each other for forming a third positive terminal; and a voltage regulator including a voltage sensing circuit for responding the output voltage of said generator and a switching transistor having a collector-emitter path connected in series with said field winding, said third positive terminal of said terminal circuit being connected with the base of said switching transistor for supplying base current therefor, said voltage regulator also including a control transistor having a collector-emitter path connected across the base-emitter path of said switching transistor and a base connected to said voltage sensing circuit so that said control transistor removes the base current for the switching transistor when the output voltage of said generator exceeds a desired level.

* * * * *